June 29, 1965  R. L. ROUGEMENT  3,191,235
APPARATUS FOR CLOSING, LOCKING AND OPENING A MOLD
Filed May 28, 1964  3 Sheets-Sheet 2
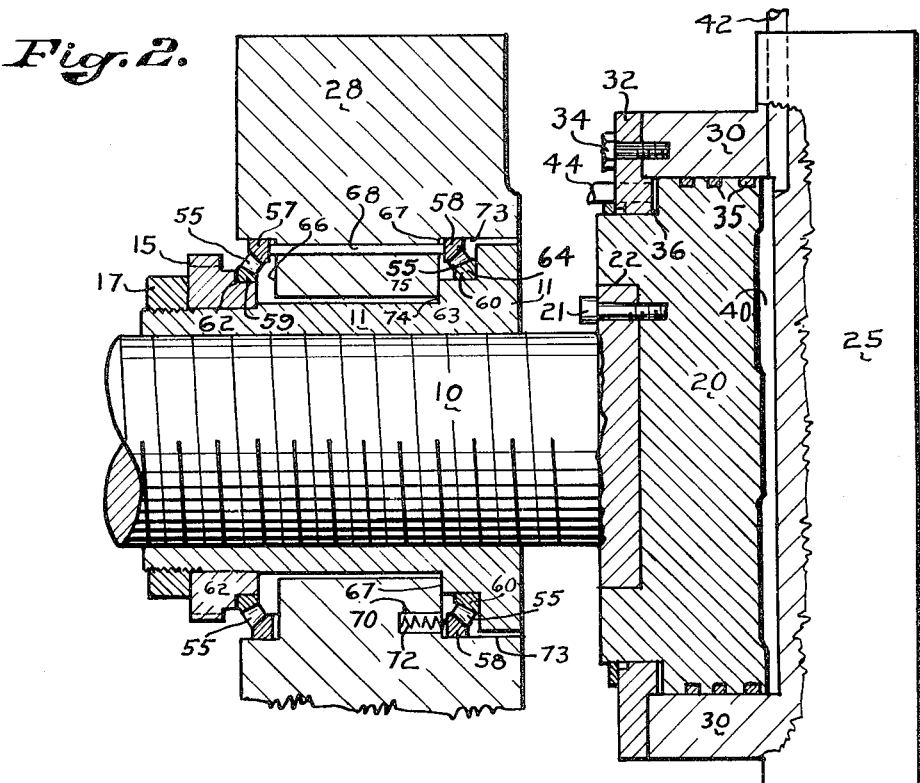
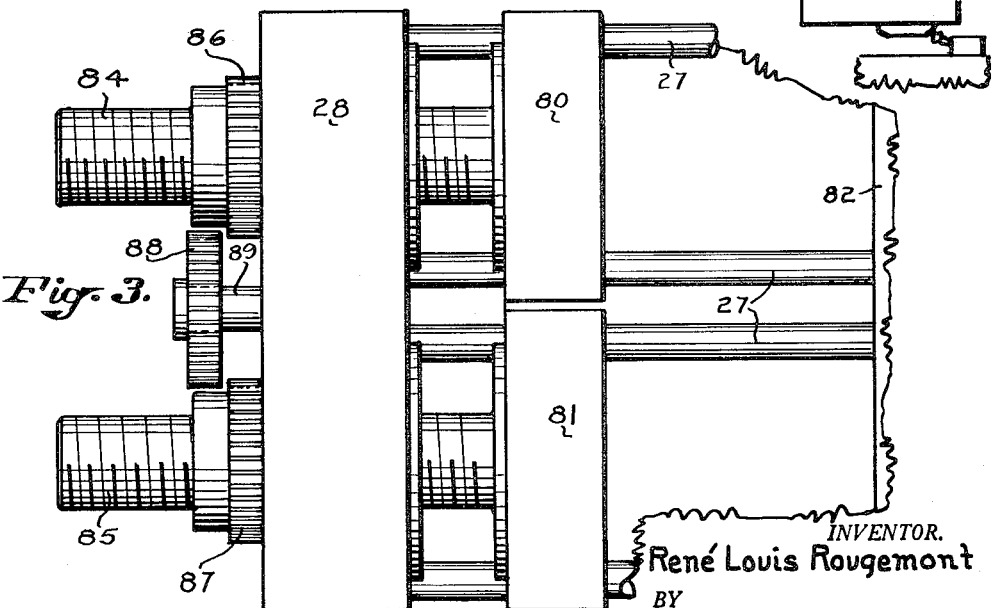
INVENTOR.
René Louis Rougemont
BY
C. Clayton L. Jenks
ATTORNEY 3,191,235
APPARATUS FOR CLOSING, LOCKING AND OPENING A MOLD
Rene Louis Rougement, 6 Baxton St., Worcester, Mass.
Filed May 28, 1964, Ser. No. 373,598
7 Claims. (Cl. 18—43)

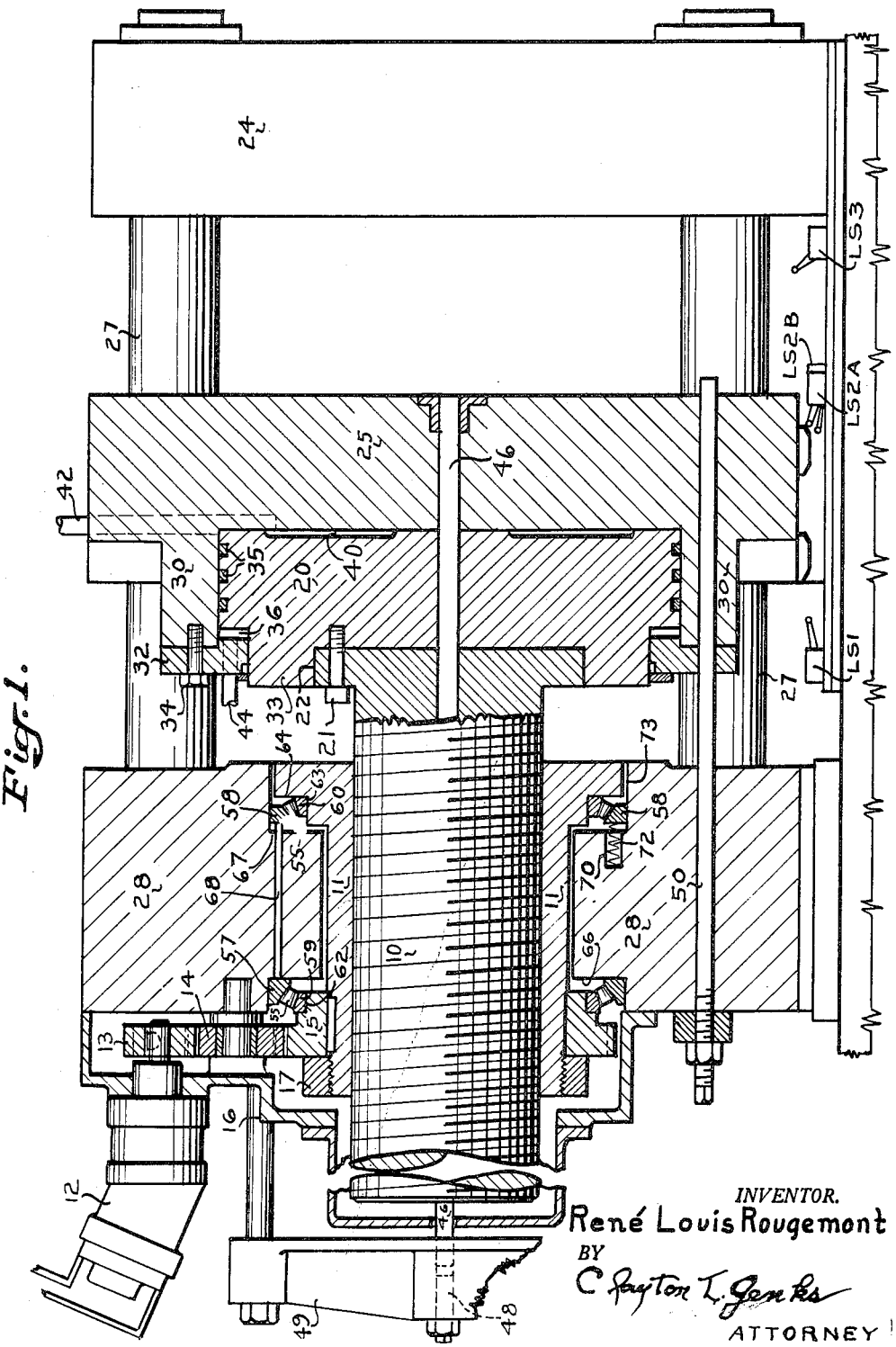

This application is a continuation-in-part of my prior application, Serial No. 170,009, filed January 31, 1962, and now abandoned.

This invention relates to a molding apparatus and more particularly to the mechanism which moves a mold platen to close, lock and open the mold.

The standard molding apparatus has fixed and movable platens connected respectively to the two mold parts, and it may comprise either a toggle joint or a long stroke piston to lock the mold. The toggle joint is located between the platen and a link housing, and the latter must be moved away for opening the mold and then be skillfully readjusted in position for the locking step. The piston operated construction has required that the platen be moved through the entire stroke to open and close the mold. Due to the compressibility of the oil in such a long cylinder, it is difficult to hold the mold positively locked and avoid flashing. Since the mold opening stroke of the piston decreases with the mold height, its available movement may be insufficient for some operations. These constructions are limited to having the platen substantially square and are not serviceable for molding large elongated bodies.

In accordance with this invention, I connect a nut and screw mechanism to the movable platen to close and open the mold and I employ an hydraulic mechanism to move the platen through the slight remaining distance relative to the screw to lock the mold. In such a construction, it is desirable that the pressure involved in locking the mold be transmitted directly to the machine frame and not through the bearings which support the revolving nut. Also, provision should be made for molding an elongated object which is much longer than the width of a mold.

It is the primary object of this invention to overcome the disadvantages of the prior constructions and to satisfy the above requirements and particularly to provide a molding apparatus in which the movable mold platen may be brought quickly to a mold closing position by a power driven nut and screw mechanism, after which the mold is locked by hydraulic pressure acting through a short piston stroke, and wherein the hydraulic mechanism is double acting and will serve both for locking the mold and opening the same.

Another object is to provide mold closing and locking mechanisms in which the adjustment for the mold closing position of the movable platen is determined solely by the proper position of an adjustable limit device which controls the power drive to the screw feed employed to move that platen and wherein the mold locking and unlocking hydraulic mechanism is governed in a timed sequence with the screw movement by means of an electrical control mechanism including an adjustably positioned limit device and a time delay mechanism.

A further object is to provide molding apparatus of this type in which the mold locking pressure is transmitted directly to the machine frame and not through the bearings which carry the rotatable nut, and particularly wherein the bearings are yieldingly moved in a coordinated relationship so as to insure such direct transmission of the pressure to the frame.

A further object is to provide apparatus of this type in which two similar screw and hydraulic feed mechanisms may be arranged in parallel and operated in synchronism to force the two movable platens into a locked position relative to a stationary platen carrying the mold and thereby serve for molding an elongated body. Other objects will be apparent in the following disclosure.

In accordance with this invention relating to a die casting or plastic injection molding machine, I employ a reversible power driven screw to move the movable mold platen to a closed position, after which an hydraulic pressure mechanism serves to move the platen further to lock the mold. The hydraulic mechanism carried by the forward end of the screw is double acting, in that when it is desired to break open the mold, hydraulic pressure is applied in a reverse direction to force the platen rearwardly through a short distance, so that the screw may thereafter readily remove it. The screw is moved axially by means of a rotatable nut, driven preferably by a reversible electric or hydraulic motor, and the nut is mounted on thrust bearings carried by a fixed part of the machine frame. The thrust bearings are preferably roller bearings having raceways which are slightly movable in coordination so that the thrust on the nut is transferred directly to the stationary frame. In order that elongated pieces may be molded, the machine may be made as duplicate, separately operable units arranged to have their rotatable nuts interconnected through a clutch which provides for a simultaneous and equal movement of the two platen moving screws, and the hydraulic platen moving mechanisms are coordinated to lock the two mold units. The molding machine is preferably operated automatically through adjustably positioned limit switches and electric timing and control switch mechanisms governing reversible valves which cause the screw to be fed forward to close the mold, after which the screw is held stationary and the reversible hydraulic mechanism moves the platen to a locked position for injection of the material to be molded, such as molten metal or a plastic. After a required time interval, the hydraulic mechanism breaks the platen from the molding zone.

Referring to the drawings illustrating a preferred embodiment of the invention:

FIG. 1 is a side elevation, partly in section and broken away, of the mechanism which moves a mold platen, the latter being shown in a closed mold position;

FIG. 2 is a fragmentary sectional detail illustrating primarily the movable bearings which carry the rotatable nut and the piston chambers which provide for moving the platen in opposite directions, and showing the platen 25 in a mold locking position;

FIG. 3 is a fragmentary sectional detail showing the clutch interconnection between the rotatable nuts of two similar molding apparatus which are connectable for molding elongated shapes;

Figure 4:
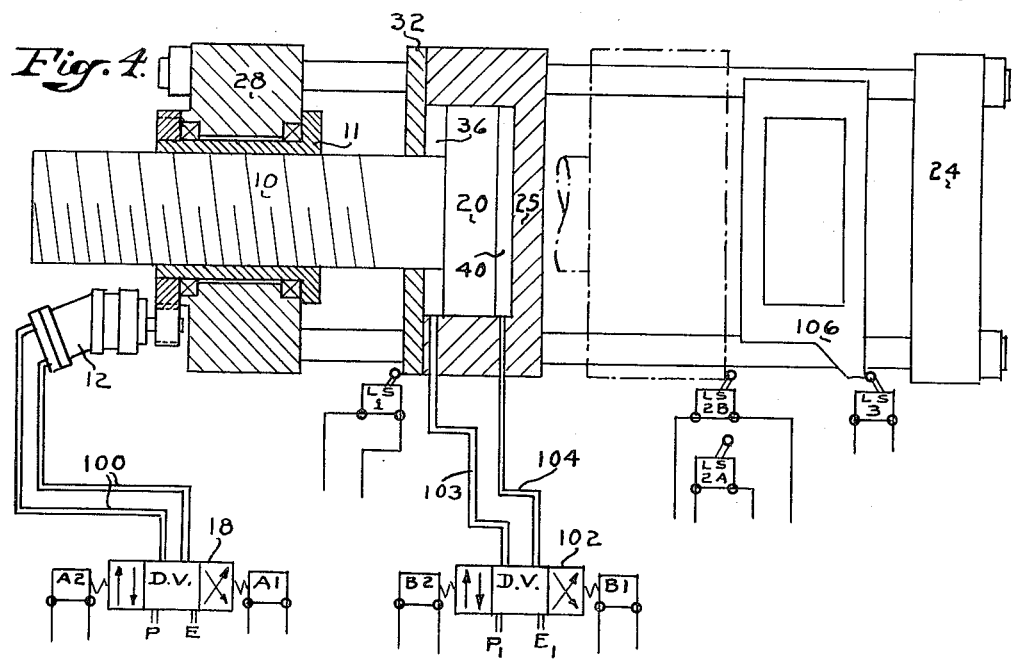
FIG. 4 is a diagrammatic showing of the solenoid operated hydraulic distributing valve mechanisms and associated limit switches which serve for moving the platen from the full line to the dotted line position.

The preferred embodiment of the molding machine invention comprises a screw 10 which is movable axially by means of a flanged driving nut 11, and which is power driven by means of a suitable reversible motor, such as the hydraulic motor 12, connected through spur gears 13 and 14 with a gear 15 fixed on the nut 11. The motor and gears 13 and 14 are suitably mounted in a housing 16 carried by the machine frame. The gear 15 is shown as a ring keyed on a cylindrical portion of the nut and clamped in place by means of a nut 17 threaded on the end of the driving nut 11. The motor 12, which may be a reversible electric motor, is shown as a reversible Vickers hydraulic motor of suitable characteristics for rotating the nut 11 in opposite directions at a rapid rate for moving the screw axially therethrough. The rotatable turbine of the motor is so constructed that the direction of rotation may be reversed by applying hydraulic pressure to opposite sides of the turbine vanes by means of a suitable distributing valve 18, shown diagrammatically in FIG. 4.

The screw 10 is rigidly connected medially to a piston head 20 by means of a series of cap screws 21 which pass through a flange 22 on the screw mounted in a recess in the piston head 20. The mold, which may be of suitable construction, comprises a stationary mold platen 24 and a movable platen 25. The stationary platen 24 is fixedly connected through a series of tie rods 27 with the main casting 28 which supports the rotatable nut 11. The movable platen 25 is suitably mounted for a reversible movement toward the stationary platen where it may be locked in position for the required molding operation, and it may be moved rearwardly by the screw 10 to provide for removing the molded article.

The platen 25 is moved rapidly toward and from the stationary platen 24 by means of the screw 10, and it is moved to and from a mold locked position by the piston 20 and associated parts. That is, the nut 11 is rotated to move the screw 10 and thrust the platen 25 forward to a closed mold position and reversely to open the mold. The hydraulic locking movement is accomplished by movement of a piston chamber formed of the annular cylindrical wall 30 made integral with or secured to the movable platen 25. That piston chamber wall 30 has the piston head 20 slidably fitted therein. The mold member 25 forms one end wall of the piston chamber, and the other end wall is formed by means of an annular plate 32 having an inner cylindrical fitting on an annular flange 33 of the piston 20 which surrounds the recess that carries the screw head or flange 22. The plate 32 is fixed to the cylindrical wall 30 by a set of cap screws 34. Suitable provisions are employed to contain the hydraulic pressure, such as sealing rings 35 and the like.

As indicated by the space 36 in FIG. 1, the outer cylinder 30 may move relative to the piston 20 through the slight distance provided by that space. Since the piston 20 is held in a fixed position by screw 10 after the latter has been stopped in its axial movement, then only the cylinder 30 and platen 25 may be moved by the hydraulic pressure. To introduce fluid under pressure to the front or right hand face of the piston 20 an annular space 40 is formed by a recess in the front face of the piston 20, and hydraulic pressure is introduced by means of a pipe line 42 suitably connected to a source of fluid under pressure. The introduction of fluid pressure thus causes the mold platen 25 to move forward through a few millimeters in extent to lock the platen 25 securely against the stationary mold part 24. Thereafter the material to be molded is suitably introduced or injected into the mold space by means of apparatus which is not part of the present invention.

It is found that the upper tie rods 27 tend to elongate more than do the lower tie rods, due to an upward heat flow from the mold. However, this does not cause the two adjacent mold faces to get out of parallelism and allow the plastic moldable material to flash outwardly from between the mold halves, because of the automatic compensation provided by the relatively floating relationship of the mold platen 25 and the piston 20. That is, the mold platen and cylinder 25, 30 can move angularly relative to the piston 20 to the very slight extent required to compensate for an uneven elongation of the tie rods and so maintain the mold faces parallel, and the sealing rings 35 will prevent escape of the fluid pressure for any relative positions of the cylinder and piston.

It is sometimes difficult to break the mold open after the molded substance has cooled or hardened and to reverse the rotation of the screw 10 due to the friction between the threads of the screw and the nut 11 when subjected to the enormous locking pressure. Therefore, the mold must be unlocked before the motor 12 reverses the dierction of rotation of the nut 11. Hence, for this purpose, I introduce fluid under pressure through a suitable pipe line 44 to the space 36 at the rear of the piston 20. Since the piston is held stationary at the time by the screw 10, the fluid pressure serves to force the end wall plate 32 rearwardly relative to the piston 20 and this plate carries the attached platen 25 rearwardly through a short distance required to break open the mold. Also, if the molded object sticks in the mold it may be suitably dislodged by means of a central pushrod 46 slidably mounted axially of the screw 10 and arranged to be projected through the platen 25 as shown in FIG. 1. That push rod 46 may be moved adjustably at its left hand end by means of a screw threaded rod 48 threaded into a fixed portion 49 of the framework, the parts being so constructed that by turning the screw threaded rod 48, the push rod may be pushed far enough through the platen to dislodge the molded body. Further push rods 50 are arranged concentrically of the platen axis for adjustable movement through the machine frame 28 and the platen 25. These various push rods may be moved manually or by suitable power mechanism, as desired.

An important feature of this construction comprises inner and outer raceways so mounted that the thrust involved in moving the platen 25 may be transmitted directly to the machine frame or casting 28. To this end, conical or other suitable bearings 55 are arranged between outer raceways 57 and 58 and inner raceways 59 and 60. The inner raceway 59 is mounted against a shoulder in an annular recess 62 in the ring 15 which is fixed to the rotatable nut 11. Similarly, the raceway 60 rides on a cylindrical surface 63 of a flange on the nut 11 and fits against the vertical shoulder 64 of that flange. Hence, the inner raceways are both fixed in position. The outer raceway 57 is located in a right angled recess in the casting 28, and is movable toward and from a vertical shoulder 66 in that recess. Similarly, the other outer raceway 58 is movable towards and from a vertical shoulder 67 in the casting 28. A set of rods 68 are slidably mounted in cylindrical holes arranged in a circle in the casting and each rod 68 is made long enough so as to be always in contact with the two outer raceways 57 and 58. The casting 28 is further provided with a circular row of recesses 70 (shown in the lower part of FIG. 2) which are concentric with the axis of screw 10, and each carries a strong spring 72 which engages and tends to push the outer raceway 58 toward the right along the cylindrical surface 73 of the casting and tightly into contact with the conical bearings 55. However, these springs yield when the hydraulic pressure thrust is toward the left when the mold is locked, and permit the outer raceway 58 to move in that direction along a cylindrical surface of the casting before it contacts tightly against the vertical shoulder 67. When this happens, the slidable rods 68 move the other outer raceway 57 toward the left and thus hold the left hand pair of bearings firmly against the inner raceway 59 and the latter against the vertical shoulder 62 of the nut. A vertical shoulder 74 on the stepped flange of the nut is at the same time moved firmly into contact with the thrust surface 67 of the casting 28. Hence, pressure involved in locking the mold is transmitted directly to the casting 28 and is not taken up by the bearings. It will be understood that the threads of the long screw 10 and the nut 11 make a substantially rigid contact, so that the screw 10 is immovable while the nut 11 is not being rotated. Hence, the pressure on the movable platen by means of fluid forced hydraulically into the piston space 40 is transmitted through the piston 20, screw 10 and nut 11 directly to the casting 28.

The mold platens 24 and 25 may be considered as having square faces of somewhat similar vertical and horizontal dimensions. If it is desired to mold an elongated piece which may be as long as double the height of the mold space of FIG. 1, I have provided the construction of FIG. 3 in which two separate substantially duplicate molding machine units are arranged in parallel for separate or cooperative operation. These comprise two separate mold platens 80 and 81 which are movable relative to two separate stationary mold platens 82 or a single platen used thereinstead. Each machine unit may be built like the unit of FIG. 1 and operated similarly as herein described. Each of these duplicate halves or units of the machine may be employed to mold desired objects separately. If, on the other hand, an elongated piece is to be molded in that double space provided by the two units, the two platens 80 and 81 are moved forward simultaneously to lock a single mold between them and the platen 82. In order that the two screws 84 and 85, corresponding with the screw 10, may be moved in synchronism, a clutch member is provided to interconnect the two power driven nuts which are similar to nut 11. To this end, the gears 86 and 87 which drive the nuts of the two units and correspond with gear 15 of FIG. 1, are interconnected by a clutch comprising a spur gear 88 which is slidably and rotatably mounted on the bearing post 89 carried by the frame 23. This gear 88 may be either disconnected from gears 86 and 87 or moved into connection therebetween, so that the two platen moving screws may be moved in synchronism to move the movable platens 80 and 81 through equal distances simultaneously. The clutch gear 88 may be manually shifted or power operated as desired.

The molding mechanism may be driven automatically through a cycle, and this may be accomplished by electrically controlling the introduction of a fluid under pressure to the various hydraulic devices as required. As illustrated diagrammatically in the simplified showing of FIG. 4, fluid under pressure may be introduced through the inlet pipe P of the solenoid operated distributing valve 18 which governs the introduction of fluid to opposite ports in the motor 12 for rotating the latter in either direction. The valve which may be of standard construction provides for the exhaust of the fluid through the outlet E. Similarly, fluid is introduced as required into one of the chambers 36 and 40 of the piston cylinder at the screw head in accordance with the operative setting or position of the solenoid operated distributing valve 102 which may also be of any suitable construction. The valve 102 serves to introduce the fluid from pipe $P_1$ through one of the pipes 103 and 104 to the required chamber of the cylinder, and to exhaust the fluid from the other chamber through vent $E_1$ as required. If the screw 10 is driven by an electric motor, the latter is governed by suitable mechanism controlled by the limit switch mechanism hereinafter described.

Figure 5:
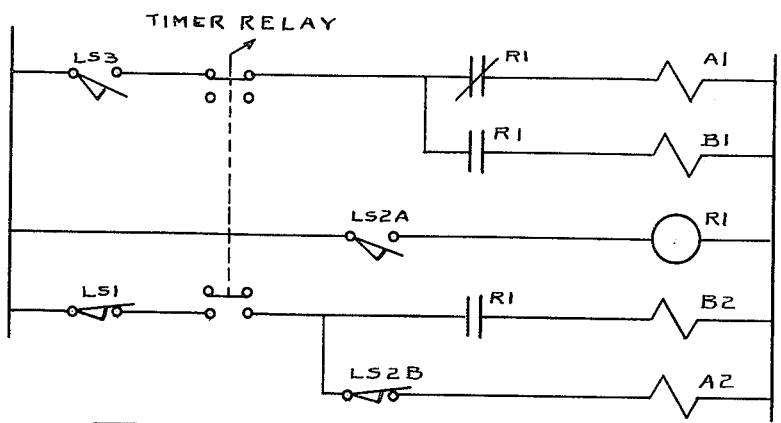
FIG. 5 is a simplified diagram of the wiring connections which control the distributing valves.

FIG. 5, which is to be viewed with FIG. 4, shows a simplified wiring diagram for controlling and operating the two distributing valves, but it will be understood that various relays, switches, and safety interlocks and other devices may be incorporated in the system as desired. The mold space between the platens 24 and 25 may be suitable guarded by a slidable safety door 106 (FIG. 4) and when the molding operation is to be accomplished, that door is slid into position and operates a normally open limit switch LS3 to close a circuit in the line and energize solenoid $A_1$ (FIG. 4). This causes the distributing valve 18 to send fluid under pressure to the motor 12 and start the rotation of the nut 11 in such a direction as to give a forward axial movement to the screw 10. The motor 12 is preferably of a high speed type so that the axial movement of the screw 10 is fairly rapid and brings the platen 26 quickly to a mold closing position, just short of a locked mold position. That closed position of the mold is such that the hydraulic piston movement caused by introducing fluid into the space 40 will bring the mold platen up to a final locked position. That is, if the hydraulic piston can move the mold platen through say ¼ inch, then the screw 10 should move the platen to within ¼ inch of its final locked position.

The various movements of the mold platen are controlled by mechanism including adjustably positioned limit switch devices which are so mounted on the machine frame that the switches will be operated in a proper timed sequence. These limit switches may be suitable or standard mechanisms and they are adjustably mounted in a suitable manner as by means of a slotted rail on the frame so arranged that each switch box may have a bolt projecting through the slot and may be clamped in position by means of a nut at the rear of the rail. Various types of precision devices may be employed for adjusting each switch box into position. Each switch, as is well understood, has a hinged arm projecting into the path of an actuating lug or member on the movable mold platen, which is so shaped as to give the desired movement to the switch arm to open or close the switch as required. The switch contacting lug on the frame may be adjustably positioned, if desired, to provide the relative adjustment between the switch and its operating lug.

The first movement of the platen 25 is effected by the screw 10 being driven constantly forward until the operating arm of the normally open switch LS2A is moved to a closed position by contact with the lug on the platen. That switch LS2A has been suitably adjusted in position so that the mold platen is brought to a mold closed position just short of a locked position. Closing the circuit (FIG. 5) at the switch LS2A also serves through a relay $R_1$ to energize the solenoid $B_1$ which serves to move the valve 102 to introduce fluid under pressure to the pipe 104 and to the piston chamber 40. That causes the mold platen 25 to move forward through the further slight distance needed to lock the mold in its final position. At the same time, the circuit to the spring loaded solenoid $A_1$ is opened by the relay $R_1$. This stops the hydraulic motor 12 and the forward feed of the screw 10. The screw 10 has brought the mold platen to a substantially closed position and the piston movement effected by introducing fluid into chamber 40 has merely to move the platen through a very short distance required to lock the mold. Hence, it is important that the location of the limit switch LS2A be such that the screw 10 is stopped at a position where the hydraulic mechanism can move the platen the further required distance to lock the mold. It is understood that the screw 10 is stationary and the hydraulic pressure can serve only to lock the mold. After the mold has been suitably locked, then moldable material is injected into the mold by suitable mechanism, and it is permitted to harden there while the mold remains locked.

The next step is to unlock the mold and to permit the screw 10 to move the platen to the required open position. Hence, a second normally open limit switch LS2B is so mounted slightly to the right of the switch LS2A that it may be closed by a switch operating lug on the platen at the time when the mold is thus locked in its final position. It is to be understood that I may use either one or two switches, or a double throw switch for the operations herein described relative to the switches LS2A and LS2B, since various types of switch mechanism may be employed to perform these various operations. Closing the switch mechanism LS2B serves to set into operation a suitable timer relay which determines the length of time during which the moldable material may be held in the mold for hardening. The various mechanisms are stationary for this time interval, after which a further sequence of events is started. The time clock, when it reaches the end of its timing cycle, serves to deenergize the solenoid $B_1$ by breaking the circuit thereto. The relay closes the circuit to the solenoid $B_2$ and this serves to reverse the distributing valve 102 and cause fluid under pressure to be transmitted through pipe 103 to the cylinder space 36 at the rear of the piston 20. At the same time the valve mechanism provides an outlet to pipe 104 for the fluid that has been under pressure in chamber 40. This causes movement of the mold platen 25 rearwardly through the slight distance permitted by the narrow space 40 and thus breaks open the mold.

When the normally open switch LS2B is closed, this serves to energize the solenoid $A_2$ of the distributing valve 18 and causes fluid under pressure to be introduced to start the motor 12 in a reverse direction to move the mold platen 25 rapidly away from the stationary platen. It will be appreciated that the hydraulic motor 18 may be momentarily stationary although with full pressure thereon until the piston movement at 36 has served to break open the mold. Then the screw 10 is rotated rapidly to remove the mold platen 25 from its molding position. This movement of the screw 10 toward the left continues until the limit switch LS1 is operated, whereupon both of the solenoids $A_1$ and $B_1$ are deenergized and the motor 12 is stopped and the pressure on the piston compartment is released. The safety door 106 may then be opened and the machine is fully inoperative and ready for the next molding cycle. The solenoids $A_2$ and $B_2$ cause fluid to be introduced to both the motor 12 and the piston chamber 36, but the motor 12 will not turn the nut 11 until the mold has been broken open to relieve the frictional pressure on the screw and nut threads. It will be appreciated that the FIG. 3 construction has the two hydraulic and switch control mechanisms suitably coordinated or operated in parallel to insure simultaneous and synchronous movement of the platens 80 and 81.

It will be understood that various standard or suitable features may be incorporated in the above-described molding apparatus. Also suitable mechanisms may be employed to inject a molten or plastic material into the mold, or to place an object into the mold which is to be die cast. Suitable provisions may be made to accommodate the extremely high pressures that may be involved and to render the mechanisms semiautomatic in their operation.

It will now be appreciated that the molding apparatus provided by my invention comprises a driven screw connected to move the movable platen from a remote position to close the mold, wherein a rotatable nut which moves the screw axially is rotated in opposite directions by a reversible motor and a driven gear system. Furthermore, the piston is moved to lock the mold by means of reversible hydraulic mechanism having a cylinder and a short stroke piston therein, wherein the piston is moved in opposite directions by means including valve mechanism which introduces fluid under pressure on either side of the piston in the cylinder both to lock and unlock the mold. The apparatus includes a remote control mechanism governing the nut rotating reversible motor which comprises a limit device adjustably positioned on the frame and operated in coordination with the movable platen, wherein its adjustment serves to compensate for variations in mold thickness. The invention also comprises a remote control mechanism including an adjustably positioned limit device operated in coordination with the movable platen which is arranged to govern the valve mechanism and cause the mold to be locked after it has been closed, and which further includes a time controlled device for causing reversal of the piston movement to unlock the mold and thereby permit a subsequent reverse rotation of the platen moving screw.

The invention further provides for molding a body larger than permitted by one of the platens. The structure comprises two movable platens, each of which is associated with a fixed platen. The driving mechanism is such that each nut may be driven independently by a reversible motor mechanism and associated gears, so that either movable platen may be moved alone to a closed mold position, and wherein a disconnectable mechanism is provided for interconnecting the two nuts so that the two movable platens may be moved simultaneously to aligned mold closing positions. I further protect the bearings for the nut from the excessive pressures involved in locking the mold. In this structure, the machine frame and the nut have opposed concentric cylindrical surfaces between which ride the bearings carried by outer and inner race ways, and the frame and nut have normally spaced, parallel, contactable surfaces and provision is made whereby the outer race way of the bearings yields under the axial thrust of mold locking and permits the two parallel surfaces to come into contact and thereby transmit the thrust directly from the nut to the frame.

This construction avoids the disadvantages of the single long piston and cylinder for closing and locking the mold, since the relative cylinder and piston movement is through only that distance required to move from a mold closed position to one of locking the mold, and the thin layer of oil under pressure is substantially incompressible and non-yielding and can resist adequately the injection pressure within the mold. Moreover, the hydraulic mechanism is not required to move the platen from an open mold position through a long distance to close the mold. That movement is accomplished rapidly by the positively acting screw which may then be held rigidly stationary while the mold is locked. Furthermore, a toggle joint mechanism is complex and expensive for the heavy machines, and it requires a careful time consuming adjustment of the stationary member to which the toggle joint is linked. My construction requires no such adjustments and will serve any stroke requirement, since the screw moves the platen to and fro according to the positions of the limit switches controlling this movement and the hydraulic mechanism has a rigid backing in the casting 28 of the machine frame for resisting its thrust. My construction is adapted for synchronization in a twin or parallel arrangement and so can mold a body twice as long as it is wide, whereas the standard machines are not suitable for the parallel arrangement shown in FIG. 3 due to the problems involved in moving the two platens in complete synchronism. Many other advantages will be apparent to one skilled in the art.

It will therefore be understood that various modifications may be made in the apparatus, and that the above description of a preferred embodiment is not to be interpreted as imposing limitations on the appended claims.

I claim:

1. Molding apparatus for reversely closing and locking a mold comprising a frame having a stationary casting provided with an opening therethrough, a fixed mold platen, tie rods connecting the casting and platen fixedly together which are separately subject to a differential heat elongation during a molding operation, a movable mold platen mounted slidably on said tie rods, a single driven screw passing through said opening and connected to move said movable platen between open and closed mold positions, a nut threaded on said screw and rotatively mounted to transmit thrust to said casting adjacent to said opening and arranged to move the screw axially, a reversible motor mechanism connected to rotate the nut rapidly in opposite directions, a reversible high pressure hydraulic mechanism comprising a cylinder with end walls forming a piston chamber and a piston movable in said chamber between said walls, one of said walls being fixed to said movable platen and said screw being connected medially to said piston to move it to a definite stationary position whereby engagement of the piston with either of said walls causes the movable platen to be moved by the screw, said cylinder and piston being relatively floatable and providing angular compensation for a differential elongation of the tie rods, means including valve mechanism for introducing fluid under pressure into said cylinder on the platen side of the stationary piston to move said cylinder and movable platen to lock the mold and on the opposite side of the piston to move the cylinder and unlock the mold, and remote control mechanism governing the nut rotating motor comprising a limit switch on the frame operated by the movable platen which is adjustably positioned to cause the screw to compensate for variations in mold thickness and move the platen to a mold closed position.

2. Apparatus according to claim 1 in which the reversible screw rotating mechanism comprises a hydraulic motor and wherein the remote control mechanism includes an adjustably positioned limit device on the frame operated in coordination with the movable platen which is arranged to govern the valve mechanism and cause the mold to be locked after it has been closed by said screw, and comprising a time controlled device which causes a reversal of the hydraulic mechanism and platen movement to unlock the mold and thereby permit a subsequent reverse rotation of the screw by the hydraulic motor.

3. Molding apparatus according to claim 1 comprising two movable platens, each being associated with a fixed platen, two parallel axis screws and rotatable nuts for moving the movable platens separately to closed mold positions, reversible motor mechanism and associated gears connected to drive each nut independently so that either movable platen may be moved alone to a closed mold position, and a disconnectable mechanism for interconnecting the two nuts so that the two movable platens may be moved simultaneously to aligned closed mold positions relative to the fixed platen for molding an elongated body longer than permitted by one movable platen.

4. Apparatus according to claim 1 comprising bearings which support the nut within the casting and means associated with the bearings which causes axial thrust on the screw to be transmitted directly to the supporting casting and thus resist rigidly the pressure of the hydraulic mechanism during the step of locking the mold.

5. Molding apparatus comprising a frame, a fixed platen, two separately movable platens, each associated with a fixed platen for a molding operation, separate mechanisms for moving each movable platen alone to a closed mold position, mechanism for locking each mold separately and for breaking it open, and a disconnectable means for interconnecting said separate mechanisms so that the movable platens may be moved simultaneously to aligned closed mold positions relative to the fixed platen for molding an elongated body longer than permitted by one movable platen.

6. Molding apparatus for closing and locking a mold comprising a frame, fixed and movable platens thereon, a rotatable nut on the frame, a screw moved axially by the nut which is connected to move the movable platen from a remote to a mold closing position, reversible power mechanism to rotate the nut, a reversible short stroke hydraulic mechanism comprising a cylinder and a piston connected between the screw and the movable platen and arranged to lock the mold while transmitting a thrust to the screw, said frame and nut having opposed concentric cylindrical surfaces and normally spaced, opposed parallel surfaces, a pair of inner and outer raceways, bearings in the raceways which roll on the cylindrical surfaces, and means whereby an outer raceway yields under axial thrust and permits contact of the opposed parallel surface of the nut and the frame, so that the axial thrust is transmitted directly from the nut to the frame.

7. Molding apparatus for closing and locking a mold comprising a frame, fixed and movable platens thereon, a rotatable nut on the frame, a screw moved axially by the nut which is connected to move the movable platen from a remote to a mold closing position, reversible power mechanism to rotate the nut, a reversible short stroke hydraulic mechanism comprising a cylinder and a piston connected between the screw and the movable platen and arranged to lock the mold while transmitting a thrust to the screw, said frame and nut having opposed concentric cylindrical surfaces and normally spaced opposed parallel surfaces, a pair of inner and outer raceways, one of which pair is confined by said opposed surfaces, bearings in the raceways which roll on the cylindrical surfaces, said outer raceways being slidable along the cylindrical surfaces of the frame under a mold locking thrust, slide rods carried by the frame which contact the two outer raceways so that the latter move laterally as a unit until said parallel surfaces come into contact and the axial thrust on the screw and the nut is transmitted directly to the frame, and resilient means yieldingly urging a sliding movement of an outer raceway in a direction opposed to said axial thrust.

References Cited by the Examiner

UNITED STATES PATENTS

| | | | |
|---|---|---|---|
| 2,051,011 | 8/36 | Smith | 18—17 XR |
| 2,370,622 | 3/45 | Gastrow | 18—30 |
| 2,484,344 | 10/49 | Hiller | 18—30 XR |
| 2,498,264 | 2/50 | Goldhard. | |
| 2,618,823 | 11/52 | Perkon | 18—30 XR |
| 2,718,662 | 9/55 | Bohannon et al. | 18—30 |

FOREIGN PATENTS 403,286  9/24  Germany.

WILLIAM J. STEPHENSON, *Primary Examiner.*

MICHAEL V. BRINDISI, *Examiner.*